Feb. 16, 1965   J. M. PERKINS ETAL   3,169,724
SPACE VEHICLE REENTRY SENSOR
Filed Oct. 26, 1961

INVENTORS
JAMES M. PERKINS
ROBERT J. TWIFORD
BY
George J. Rubens
ATTORNEY

United States Patent Office 3,169,724
Patented Feb. 16, 1965

3,169,724
SPACE VEHICLE REENTRY SENSOR
James M. Perkins and Robert J. Twiford, Oxnard, Calif., assignors to the United States of America as represented by the Secretary of the Navy
Filed Oct. 26, 1961, Ser. No. 148,000
6 Claims. (Cl. 244—1)
(Granted under Title 35, U.S. Code (1952), sec. 266)

The invention described herein may be manufactured and used by or for the Government of the United States of America for governmental purposes without the payment of any royalties thereon or therefor.

This invention relates to sensing devices, and more particularly to a sensor for energizing an electrical circuit or the like, such as at a predetermined time or elevation after re-entry of a space vehicle into the earth's atmosphere.

In the testing of space vehicles, such as satellites, it is incumbent that the instrument package, usually located in the nose cone, be recovered for processing of the valuable data recorded in flight. In addition, recovery enables the salvaging of the expensive electronic instruments. Such recovery is usually accomplished by means of a parachute which is deployed after the vehicle enters the earth's atmosphere where the parachute is effective.

Various devices have been utilized to sense the entry of the vehicle in the earth's atmosphere, such acceleration switches for arming a barometric switch or for initiating a timing device, or, similarly, a barometric switch. Each of the prior art devices present a disadvantage, for example, using an acceleration switch for arming a barometric switch necessitates that the vehicle be stabilized so that deceleration is parallel to the sensing axis of the acceleration switch. Barometric switches can be inadvertently actuated at a higher altitude by ram pressure if the vehicle is tumbling or is otherwise unstable. Thus, for increased reliability, duplicate barometric switches are usually employed resulting in a complex and expensive device, and one that presents a larger space requirement.

The present invention overcomes the shortcomings of the prior art devices by employing a heat sensitive element at the skin layer of the vehicle, the element being sensitive to the aerodynamic heating to which the vehicle is subjected. In the preferred embodiment, the heat sensitive element is a predetermined thickness of the ablation material of which the nose cone is constructed. The ablation material has a rate of disintegration that is very closely predictable so that after a predetermined amount of ablation, a switch within the vehicle nose is actuated to energize the electrical circuit or the like. Another way of accomplishing this result is to utilize an adhesive as the heat sensitive element, the bonding strength of the adhesive selected to fail at the predetermined temperature to energize the switch.

An important object of this invention is to provide a heat sensitive means for sensing the predetermined time or point of the re-entry of a vehicle into the earth's atmosphere.

Another object is to provide such a sensing means on the skin of the vehicle capable of triggering a circuit or the like within the vehicle.

Still other objects are to provide such a sensing means which is simple and compact in construction; which is highly reliable; and which is capable of being readily checked prior to use.

Other objects and many of the attendant advantages of this invention will be readily appreciated as the same becomes better understood by reference to the following detailed description when considered in connection with the accompanying drawings wherein.

Figure 1:
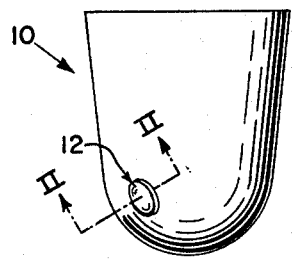
FIG. 1 is an elevation view of a re-entry nose cone having a sensor attached thereto according to the present invention.
Figure 2:
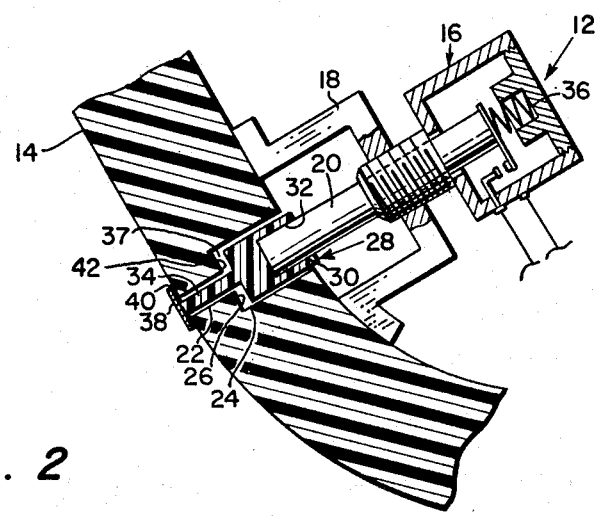
FIG. 2 is an enlarged cross-sectional view taken along line II—II of FIG. 1 with the switch shown in an open position.

Referring to the drawing where like reference numerals refer to similar parts throughout the drawing there is shown in FIGS. 1 and 2 an aerodynamic vehicle, such as a re-entry nose cone 10 of conventional manufacture, on which is mounted a sensor 12 constructed according to the teaching of this invention.

Nose cone 10 is fabricated with an outer heat shield 14 made of a material capable of withstanding the severe aerodynamic heating caused by air friction when the nose cone re-enters the earth's atmosphere at speeds as high as 15,000 feet/second. The heat shield protects the various recording and other instruments, not shown, which are usually mounted within the nose cone. Sensor 12 comprises a switch 16 or the like that energizes an electrical circuit (not shown) in the nose cone, the switch being threadedly mounted on a bracket 18 secured to an inside wall of heat shield 14. The switch is actuated by a slidable armature 20, the armature being biased to a closed position by a spring 36.

The heat shield is provided with a drilled opening 22 extending from the outside surface of the heat shield into an enlarged opening 24 leading into the cone interior which provides the opening with an intermediate shoulder 26. A plug 28 is freely slidable in the openings, an enlarged 30 end being slidably mounted in opening 24 and having a socket 32 to receive the end of armature 20. The other integral end 34 of plug 28 is reduced in diameter to form a pin slidably fitting in the smaller opening 22. Pin 34 is longer than the length of opening 22 for a purpose presently to be described. As a typical example for purposes of illustration, opening 22 can be in the order of one-sixteenth inch in diameter, and disc 38 can be one-eighth inch in diameter and one-thirty second of an inch thick. Plug 28 is biased by spring 38 to a position to energize the switch, at which position the plug abuts shoulder 26.

Plug 28 is maintained in the position shown in FIG. 2 spaced at 37 i.e. one-thirty second of an inch from shoulder 26, by a disc 38 secured by an adhesive 40 to the exterior surface of the heat shield. Disc 38 blocks the mouth of opening 22 and prevents the movement of plug 28 to close switch 16. If desired, the surface of the heat shield can be recessed (not shown) to receive disc 38 to provide a smoother aerodynamic surface. Disc 38 is preferably made of a conductive metal, such as copper, for a reason presently to be described.

The adhesive is selected from a group according to its bonding strength. For example, if it is desired that switch 16 be energized when the nose cone skin reaches a temperature of approximately 300° F., then an epoxy adhesive can be used to secure disc 38 to the skin; and for a temperature of 1000° F., a phenolic adhesive can be employed. When the skin temperature reaches the predetermined value, the heat being readily transmitted to the adhesive through the copper disc, the adhesive has lost its bonding strength to the extent that switch spring 36 has sufficient force to overcome the adhesive bond strength and the disc is ejected away from the heat shield, allowing plug 34 to be seated against shoulder 26 and the switch closed. Pin 34 of the plug 28 is made of a fusible material, i.e. an ablation material, so that the end of pin 34, coming in contact with the atmosphere through opening 22, is fused within the opening by the surface temperature to form an airtight seal and prevent the entrance of the high temperature atmosphere or water into the capsule. If opening 22 was not sealed, it is likely that an erosion of the skin around the opening would quickly occur, especially if the skin were made of an ablation material, that could result in total destruction of the capsule prior to recovery. The shoulder 26 may be formed with an inner annular edge 42 which engages the plug when seated to provide an additional sealing means against the entry into the capsule of the high temperature atmosphere or water.

The embodiment of FIG. 2 is more suitable for use in an environment where the heat shield is not exposed to the atmosphere during launch i.e. housed within another vehicle or covering since the temperature that would be experienced in the launch and ascent phases might cause accidental actuation of the sensor through deterioration of the adhesive bond.

Figure 3:
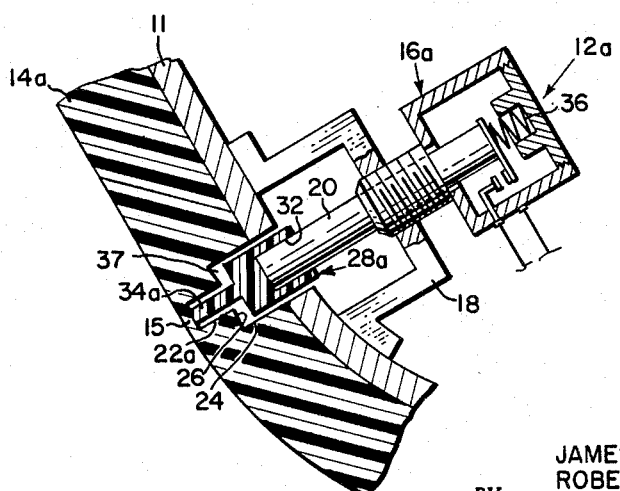
FIG. 3 is a cross-sectional view similar to FIG. 2 of a modified sensor construction.

In the embodiment of FIG. 2, heat shield 14 can be made of an ablation material or any other suitable material, that is, the invention of FIG. 2 does not require any particular type of heat shield material. In FIG. 3, a modified sensor 12a is shown where the heat shield is constructed of an ablation material which greatly simplifies the sensor by eliminating the need for a disc element and an adhesive. For the most part, the elements of sensor 12a of FIG. 3 are identical to that of FIG. 2, the differences being hereinafter noted. The nose cone comprises a skin 11 having a substantial thickness of a heat shield 14a, being a conventional ablation material that may be in the order of one-half inch in thickness. Opening 22a is drilled from within the nose cone to a distance short of the outer surface of the heat shield by an amount depending on the temperature that is desired to actuate the recovery system. The rates of ablation of known materials are very closely predictable so that the depth of opening 22a from the interior surface of the nose cone can be readily determined. Thus the remaining thin wall portion 15 of the ablation material between opening 22 and the outer nose cone surface provides a barrier to the movement of pin 34a of plug 28a, the pin 34a being smaller in length compared to pin 34 of FIG. 2. When wall portion 15 is completely eroded away by the high surface temperature to which the nose cone is subjected to during reentry, the pin 34a is free to move through the newly formed mouth of opening 22a in the heat shield allowing the closing of switch 16a. Plug 28a can be constructed of the same ablation material as heat shield 14a whereby, as described with reference to plug 28, pin 34a is fused into the opening 22a to form an effective seal against the entrance of the hot atmospheric air into the cone interior.

According to the present invention, a sensor is provided which is compact, light in weight, and has a quick reaction time. The sensor includes a switch or any other type of component which is to be actuated to accomplish a predetermined function within the capsule. The sensor can be constructed to utilize the degradation of the adhesive strength of a material due to aerodynamic heating, which form permits the sensor to operate over a wide predetermined temperature range that may be below ablative temperatures. The sensor can also be designed to operate by the ablation of a heat shielding material a predetermined time or point in space during reentry into the earth's atmosphere, and in this modification the sensor could be incorporated in a vehicle launched from the ground and requiring no protective covering. The electrical circuit containing the sensor switch can include a time delay device for delaying the deployment of the parachute.

Obviously many modifications and variations of the present invention are possible in the light of the above teachings. It is therefore to be understood that within the scope of the appended claims the invention may be practiced otherwise than as specifically described.

We claim:

1. Sensing apparatus for functioning at a predetermined time or point in space during reentry of a vehicle into the earth's atmosphere comprising a vehicle heat shield having an inner and outer surface and having an opening extending transversely therein from the inner surface, heat sensitive barrier means located on an outer surface for blocking the opening, said barrier means being constructed of ablative material affected by a predetermined time of exposure to an atmospheric condition to uncover said opening, means positioned in the opening and biased for movement toward the outer surface, movement of said last mentioned means capable of actuating a mechanism within the vehicle, whereby reentry of the vehicle at the predetermined condition will initiate the mechanism.

2. Sensing apparatus for functioning at a predetermined time or place in space during reentry of a vehicle into the earth's atmosphere, comprising a vehicle heat shield having an inner and outer surface, said shield having an opening extending transversely therethrough with an intermediate shoulder, a plug slidably mounted within said opening and biased toward the outer surface, said plug having a shoulder adapted to abut said shoulder in the opening, said plug being made of fusible material, a metal disc secured by an adhesive to the outer shield surface to block said opening, said adhesive having a predetermined bonding strength whereby entry of the vehicle in the atmosphere causes the adhesive to release said disc and uncover the opening, an end of the plug moving into the atmosphere where it is fuzed to the opening in sealing relation.

3. Sensing apparatus for functioning at a predetermined time or place in space during reentry of a vehicle into the earth's atmosphere, comprising a vehicle heat shield having an inner and outer surface, said heat shield made of ablation material having a predetermined rate of dissipation, said shield having an opening extending transversely therein and terminating at a point a predetermined distance from the outer surface, the thickness of the heat shield between the outer surface and the end of the opening being predetermined, a plug slidably mounted within the opening and biased to engage the heat shield at the end of the opening, whereby entry of the vehicle in the atmosphere causes the ablation material to dissipate for a predetermined period of exposure time until the opening is uncovered, the plug moving into the atmosphere.

4. Sensing apparatus for functioning at a predetermined time or place in space during reentry of a vehicle into the earth's atmosphere, comprising a vehicle heat shield having an inner and outer surface, said heat shield made of ablation material having a predetermined rate of dissipation, said shield having an opening extending transversely therein and terminating at a point a predetermined distance from the outer surface, the thickness of the heat shield between the outer surface and the end of the opening being preselected, a plug slidably mounted within the opening and biased to engage the heat shield at the end of the opening, said plug being made of fusible material, whereby entry of the vehicle in the atmosphere causes the ablation material to dissipate for a predetermined period of time until the opening is uncovered, the end of the plug moving into the atmosphere to be fuzed and sealing the opening.

5. Sensing apparatus for functioning at a predetermined time or point in space during reentry of a vehicle into the earth's atmosphere comprising a vehicle heat shield having an inner and an outer surface, and having an opening extending transversely therein from the inner surface, heat sensitive barrier means located on an outer surface for blocking the opening, said barrier means being affected by a predetermined time of exposure to an atmospheric condition to uncover said opening, a plug means made of fusible material slidably movable in the opening and biased for movement toward the outer surface, movement of said last mentioned means capable of actuating a mechanism within the vehicle, whereby reentry of the vehicle at the predetermined time will initiate the mechanism, and the uncovered opening will be sealed by the plug upon contact with the atmosphere through said opening.

6. The apparatus of claim 5 wherein said opening has an enlarged portion forming a shoulder, and said plug has a corresponding enlarged portion adapted to abut said shoulder to limit the outward movement in the opening.

References Cited by the Examiner
UNITED STATES PATENTS 3,034,439    5/62    Hirsch _____ 244—117

FOREIGN PATENTS 688,399    3/53    Great Britain.

FERGUS S. MIDDLETON, *Primary Examiner.*